United States Patent

Schwyn et al.

[15] 3,637,435
[45] Jan. 25, 1972

[54] METALLIZING PROCESS FOR GLASS-FREE CERAMICS BODIES

[72] Inventors: Raymond E. Schwyn, Flint; Morris Berg, Grand Blanc, both of Mich.

[73] Assignee: General Motors Corporation, Detroit, Mich.

[22] Filed: July 8, 1969

[21] Appl. No.: 840,007

Related U.S. Application Data

[63] Continuation-in-part of Ser. No. 597,868, Nov. 30, 1966, abandoned.

[52] U.S. Cl. ........................117/227, 117/46 CA, 117/160, 264/61, 264/62, 264/65
[51] Int. Cl. .......................................................C04b 41/14
[58] Field of Search ............... 264/61, 65, 62; 117/22, 62.9, 117/119.6, 202, 227, 160; 106/1; 252/515, 518

[56] References Cited

UNITED STATES PATENTS

| | | | |
|---|---|---|---|
| 2,613,153 | 10/1952 | Stafford | 106/41 |
| 3,473,987 | 10/1969 | Sowards | 264/59 |
| 3,312,533 | 4/1967 | Botden et al. | 264/60 |
| 3,403,043 | 9/1968 | Thompson | 117/160 |
| 2,667,427 | 1/1954 | Nolte | 117/22 |
| 2,667,432 | 1/1954 | Nolte | 117/22 |
| 2,835,967 | 5/1958 | Umblia | 117/22 |
| 3,296,017 | 1/1967 | Rubin | 117/169 |
| 3,446,643 | 5/1969 | Karlak | 106/1 |

FOREIGN PATENTS OR APPLICATIONS

| | | | |
|---|---|---|---|
| 639,124 | 3/1962 | Canada | 117/22 |

OTHER PUBLICATIONS

R. D. Bagley et al., " Effect of $TiO_2$ on Initial Sintering of $Al_2O_3$ ," An Article Appearing in the March, 1970 issue of the Journal of the American Ceramic Society at pages 136– 141. Also Presented at the 65th Annual Meeting of the ACS, Pittsburg, Pa. Apr. 30, 1963 (Basic Science Division No. 9– B– 63)

E. J. Smoke et al., " Hydrogen & Vacuum Firing" An Article Appearing in the Apr., 1965 issue of Ceramic Age at pages 103– 104.

*Primary Examiner*—Donald J. Arnold
*Assistant Examiner*—John H. Miller
*Attorney*—Sidney Carter and Peter A. Taucher

[57] ABSTRACT

This invention relates to sintered, substantially glass-free, ceramic bodies, and more particularly to an improved method of producing a metallized surface on such ceramic bodies. The method includes coating a sintered ceramic body with a metallizing ink composition containing a metal from the group molybdenum, tungsten, and mixtures of each of such metals with manganese, and subsequently firing the coated ceramic body in a wet reducing atmosphere to oxidize the metal from said first-mentioned group to yield a metallic layer which is tightly bonded to the surface of the ceramic body. The oxide of the metal from said first-mentioned group bonds directly to the ceramic body which in turn mechanically adheres the metal layer, from said second-mentioned group, to the ceramic body.

5 Claims, 1 Drawing Figure

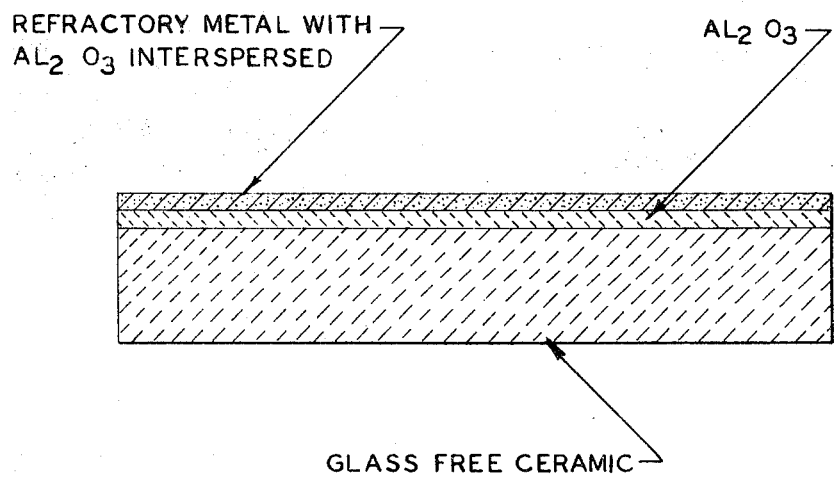

METALLIZING PROCESS FOR GLASS-FREE CERAMICS BODIES

This application is a continuation-in-part of copending application Ser. No. 597,868, filed Nov. 30, 1966, now abandoned.

Hermetic ceramic-to-metal seals having high strength are required in the manufacture of high-vacuum tube envelopes and other feedthrough insulators for electrical devices. In making these ceramic-to-metal seals it is necessary to form a vacuumtight bond between the ceramic body and the metal. This is generally accomplished by metallizing the surface of the ceramic body; that is, bonding a thin metallic film onto the surface of the ceramic body and then bonding this metallized surface to the metal portion of the electrical device by conventional means such as brazing. Most commonly used metallizing processes involve the use of molybdenum and manganese metals in which the manganese reacts with the water vapor when heated in a wet, hydrogen atmosphere to form manganese oxide. The manganese oxide reacts with the glass phase in the ceramic to form a compound which melts to form a bonding layer. This bonding layer adheres tightly to both the surface of the glass-containing ceramic body and to the thin metallic film of molybdenum. In metallizing ceramic bodies which are relatively glass-free, it has in the past been necessary to add silica, calcia, kaolin, or other glass-forming materials to the metallizing inks in order to promote the formation of the bonding layer.

Metallizing methods which depend upon a glass phase to bond the metal film to the surface of the ceramic body such as those described above, have several disadvantages. The metal film produced by these methods has a glass phase therein as a result of absorbing during the sintering step some of the glass from the bonding layer. The presence of the glass phase in the metal film tends to cause the metal film to have low-thermal conductivity and low-electrical conductivity. For example, if too much glass is present in the metal film, the result is a glassy surface which has a relatively high-electrical resistance and which is difficult to braze metals thereto. Another disadvantage with the metallizing methods described above is that the glass phase in the bonding layer and in the metallic film layer may react with constituents of the environment in which some of the electrical devices are operated thereby causing a failure. For example, metallized alumina bodies containing silica were found to react when exposed to cesium. Since these conventional fired ceramic metallizing methods require a glass phase either as a constituent of the ceramic body or as a material added to the ink, they are not suitable for forming glass-free metallized ceramic bodies.

It is a primary object of this invention to provide an improved method of metallizing substantially glass-free sintered ceramic bodies. It is another object of this invention to provide an improved method of metallizing high-purity sintered alumina bodies. It is yet another object of this invention to form a substantially glass-free metallized ceramic body in which the metallic coating has high-thermal conductivity and high-electrical conductivity.

These and other objects are accomplished by metallizing a sintered substantially glass-free ceramic body with a metallizing ink composition containing fine grained powder taken from the group consisting of aluminum, magnesium and beryllium. A specific and preferred embodiment in accordance with the practice of this invention is a metallizing ink composition containing a liquid vehicle, aluminum powder and a refractory metal such as molybdenum powder. The mixture may contain a small amount of nickel powder to aid in sintering. The metallizing ink composition is sprayed or otherwise suitably applied onto the surface of a high-purity sintered alumina body which is then fired in a wet reducing atmosphere to yield a metallic layer tightly bonded to the surface of the high-purity alumina body. The aluminum powder in the metallizing ink composition is oxidized and is sintered tightly to the alumina body and enables the sintered molybdenum to adhere or bond tightly to the alumina surface. The metal film on the surface of the high-purity sintered alumina body is essentially glass-free and, as a result, has relatively high-thermal conductivity, high-electrical conductivity, and is chemically inert to materials reactive with glass. We have found that the alumina formed in the powder mixture during firing and while in intimate contact with the ceramic body sinters readily to the body forming the desired tight bond even in the absence of glass. We have found that the aluminum does not serve to fuse the refractory metal powder into a solid compact but instead forms a bond to the ceramic body which adheres the refractory metal layer mechanically to the ceramic. The firing temperature is high enough to sinter the refractory metal powder into a continuous film with alumina dispersed throughout.

In general, the process of our invention may be carried out as follows. A powder taken from the group consisting of aluminum, beryllium, and magnesium is mixed with one or more of the well-known refractory metals such as molybdenum and tungsten to form a powdered metallizing mixture. The concentration of the aluminum, beryllium, and magnesium in the powdered metallizing mixture is from about 15 to 40 weight percent, aluminum being the preferred metal powder of this group and is preferred in an amount of about 20 to 30 percent. The particle size of the aluminum powder is less than 50 microns with the preferred size being less than 40 microns. We have found it necessary that there be no coating on the powder grains to insure oxidation. The particles size of the molybdenum and tungsten refractory metallizing metals used in the mixture is less than 5 microns with the preferred particle size of these powders being 2 to 5 microns. The use of fine sized powder is necessary to enable intimate bonding in the manner described above. Whereas coarse grained powders can be used in making compacts, such cannot be used in our process. The concentration of these well-known refractory metals, for example, molybdenum, in this mixture is from about 60 to 85 weight percent. A mixture of molybdenum and manganese as well as a mixture of tungsten and manganese in which the mixtures contain about 5 to 40 weight percent manganese may be used in place of the molybdenum or tungsten. The concentration of the nickel powder, when used, is 0.01 to 1.0 weight percent. We have found that poor bond strength is obtained where the amount of aluminum or other such powder is less than about 15 weight percent. Where the amount exceeds about 40 percent we find it difficult to braze to due to poor wetting characteristics.

As is a common practice in the art, the metallizing powder mixture is mixed with a liquid vehicle to form a metallizing ink composition which is applied onto the surface of the body by brushing, spraying, screening, or other suitable methods. Any suitable liquid vehicle which is commonly used in metallizing ink compositions can be employed in the practice of this invention such as any of the well-known squeegee oils used in silk screen printing, or a mono or dialkyl ether, for example, a dibutyl ether, of diethylene glycol solution containing 2 to 4 weight percent ethyl cellulose. The concentration of the liquid vehicle in the metallizing ink composition is in the amount of about 25 weight percent of the powder mixture. The liquid vehicle is completely burned off without residue during firing and is important only as a means of retaining the metal powder on the ceramic body during processing. It is preferred that burn-off take place at temperatures of less than about 600° F.

The metallizing ink composition of this invention has been successfully applied to alumina, beryllia, and zirconia ceramic bodies, bodies normally difficult to metallize in the absence of glass. For example, substantially glass-free, high-purity alumina bodies having a content of 99 percent or more $Al_2O_3$ have been successfully metallized in accordance with this invention.

In accordance with the teachings of our invention, after the ceramic body has been coated with a film or layer of the metallizing ink, it is then heated in a moist reducing atmosphere such as disassociated ammonia. An atmosphere having a dew point of about 80° F. is conveniently obtained by passing the gas mixture through water at room temperature. Other reducing atmospheres known in the art, i.e., wet forming gas, are also satisfactory. The degree of moisture is not critical and need be only that sufficient to cause oxidation of the aluminum or like metal. The coated ceramic body is fired in this reducing atmosphere for a period of approximately 30 minutes at a temperature ranging from 2,200° to 3,200° F. depending on the firing temperature required to sinter the refractory metal mixture. Firing under these conditions sinters the metal mixture to form a metallic layer which adheres or bonds tightly to the ceramic body.

Typical examples in accordance with the practice of this invention for metallizing sintered ceramics are as follows.

EXAMPLE NO. 1

A high-purity alumina body containing 99 weight percent alumina, 0.12 weight percent MgO and 0.10 weight percent $SiO_2$ was coated with a metallizing ink composition which contained about 26 parts by weight aluminum, particle size less than 38 microns; about 74 parts by weight molybdenum powder, particle size 2 to 5 microns; approximately 0.01 parts by weight nickel powder; and approximately 25 parts by weight of a commercially available squeegee oil such as is used in conventional silk screen printing. The coated alumina ceramic body was fired at 3,000° F. for 30 minutes in a disassociated ammonia atmosphere having a dew point of approximately 80° F., producing an outer metallic layer which was tightly bonded to the ceramic body.

EXAMPLES 2 THROUGH 8

The following table lists examples 2 through 8 in which different ceramics were successfully metallized by the methods taught in accordance with our invention.

| Example No. | Ceramic | Sintering Temperature, °F.* | Metallizing Ink Composition |
| --- | --- | --- | --- |
| 2 | Alumina, 95% $Al_2O_3$ | 3,000 | Same as example 1 |
| 3 | Alumina, 99% $Al_2O_3$ | 3,000 | 87.5 parts Mo; 12.5 parts Al |
| 4 | Alumina, 99% $Al_2O_3$ | 3,000 | 62.5 parts Mo; 37.5 parts Al |
| 5 | Beryllia | 2,670 | Same as example 1 |
| 6 | Zirconia | 2,670 | Same as example 1 |
| 7 | Steatite | 2,200 | Same as example 1 |
| 8 | Forsterite | 2,200 | Same as example 1 |

* 30 minutes in a disassociated ammonia atmosphere having a dew point of 80° F.

The data in the table shown above indicates that the metallizing ink composition can be used on high-purity alumina, beryllia and zirconia bodies, there being glass-free bodies, as well as steatite and forsterite bodies which do contain glass and thus may also be metallized by methods known in the art. The accompanying drawing diagrammatically shows a body formed in accordance with our invention.

While the embodiment of the present invention herein disclosed constitutes a preferred form, it is to be understood that other forms might be adopted.

What is claimed is:

1. A method of metallizing the surface of a substantially glass-free alumina body comprising the steps of applying a metal powder coating onto said surface; said coating consisting essentially of about 15 to 40 weight percent of a fine metal powder taken from a first group consisting of aluminum and magnesium, about 60 to 85 weight percent of a fine metal powder taken from a second group consisting of molybdenum, molybdenum-manganese mixture, tungsten and tungsten manganese mixtures where said mixtures contain about 5 to 40 weight percent manganese, said powders being carried by a liquid vehicle which is completely burned off without residue at elevated temperatures, oxidizing the metal powder from said first group by heating said coated body at a temperature of about 3,000° F. in a moist-reducing atmosphere whereby the oxide of said metal powder taken from said first group is sintered to said body and is interspersed in the metal taken from said second group to form a firmly adherent coating on said sintered ceramic body having properties of high thermal and electrical conductivity, the metal powder taken from said first group being less than 50 microns in size and the metal powder taken from said second group being less than 5 microns in size.

2. A method as described in claim 1 wherein said metal powder in said first group is aluminum.

3. A method as described in claim 2 wherein said second group metal powder is molybdenum.

4. A method as described in claim 1 wherein said first group metal is aluminum in an amount of about 20 to 30 percent by weight and the metal in said second group is molybdenum in an amount of about 70–80 percent by weight.

5. A method as described in claim 3 wherein said first group metal is aluminum in an amount of about 26 percent by weight and the metal in said second group is molybdenum in an amount of about 74 percent by weight and said coated body is held at firing temperature for about 30 minutes.

* * * * *

PO-1050
(5/69)

UNITED STATES PATENT OFFICE
CERTIFICATE OF CORRECTION

Patent No. 3,637,435    Dated Jan. 25, 1972

Inventor(s) Raymond E. Schwyn and Morris Berg

It is certified that error appears in the above-identified patent and that said Letters Patent are hereby corrected as shown below:

In the title of the patent, line 2, "CERAMICS" should read -- CERAMIC --.

In the ABSTRACT, line 5, after "group" insert -- aluminum, magnesium, and beryllium and a metal from the group --.

In the specification title, Col. 1, line 1, "CERAMICS" should read -- CERAMIC --; line 10, "vacuumtight" should read -- vacuum-tight --; line 48, after "the" insert -- metallizing --.

Col. 2, line 26, "particles" should read -- particle --.

In the claims, Col. 4, line 3, "there" should read -- these --.

Signed and sealed this 15th day of August 1972.

(SEAL)
Attest:

EDWARD M.FLETCHER,JR.
Attesting Officer

ROBERT GOTTSCHALK
Commissioner of Patents